US006687557B2

(12) United States Patent
Ouchi (10) Patent No.: US 6,687,557 B2
(45) Date of Patent: Feb. 3, 2004

(54) CONSOLIDATED COMPONENT CATALOG (76) Inventor: Norman Ken Ouchi, 20248 View Crest Ct., San Jose, CA (US) 95120

(*) Notice: Subject to any disclaimer, the term of this patent is extended or adjusted under 35 U.S.C. 154(b) by 0 days.

(21) Appl. No.: 10/078,819

(22) Filed: Feb. 19, 2002

(65) Prior Publication Data
US 2003/0163214 A1 Aug. 28, 2003

(51) Int. Cl.[7] .............................................. G06F 19/00
(52) U.S. Cl. .......................... 700/95; 700/99; 700/107; 705/7; 705/22; 705/28; 707/964
(58) Field of Search ............................. 700/95, 99, 107

(56) References Cited

U.S. PATENT DOCUMENTS

| | | | |
|---|---|---|---|
| 4,503,499 A | 3/1985 | Mason et al. ................ 709/101 |
| 4,862,376 A | 8/1989 | Ferriter et al. .............. 700/107 |
| 5,182,705 A | 1/1993 | Barr et al. ..................... 705/11 |
| 5,191,534 A | 3/1993 | Orr et al. ..................... 700/105 |
| 5,311,438 A | 5/1994 | Sellers et al. ................. 700/96 |
| 5,436,730 A | 7/1995 | Hube .......................... 358/401 |
| 5,490,097 A | 2/1996 | Swenson et al. ............... 703/2 |
| 5,710,921 A | 1/1998 | Hirose ........................ 709/106 |
| 5,734,837 A | 3/1998 | Flores et al. ................... 705/7 |
| 5,745,687 A | 4/1998 | Randell ....................... 709/201 |
| 5,774,661 A | 6/1998 | Chatterjee et al. .......... 709/203 |
| 5,796,986 A * | 8/1998 | Fuller .......................... 700/95 |
| 5,799,297 A | 8/1998 | Goodridge et al. ............. 707/1 |
| 5,812,130 A | 9/1998 | Van Huben et al. ........ 345/764 |
| 5,826,020 A | 10/1998 | Randell ....................... 709/202 |
| 5,832,455 A | 11/1998 | Hayashi et al. ................ 705/7 |
| 5,867,824 A | 2/1999 | Saito et al. ..................... 705/9 |
| 5,940,829 A | 8/1999 | Tsuiki et al. .................. 707/10 |
| 5,978,836 A | 11/1999 | Ouchi ......................... 709/206 |
| 5,999,910 A | 12/1999 | Rosenfeld et al. .............. 705/7 |
| 5,999,911 A | 12/1999 | Berg et al. ...................... 705/9 |
| 5,999,937 A | 12/1999 | Eller .......................... 707/101 |
| 6,006,195 A | 12/1999 | Marchak et al. ............... 705/9 |
| 6,032,124 A | 2/2000 | Saito et al. ..................... 705/9 |
| 6,041,306 A | 3/2000 | Du et al. ........................ 705/8 |
| 6,072,481 A * | 6/2000 | Matsushita et al. ......... 700/214 |
| 6,151,583 A | 11/2000 | Ohmura et al. ................ 705/8 |
| 6,170,002 B1 | 1/2001 | Ouchi ......................... 709/206 |
| 6,256,549 B1 * | 7/2001 | Romero et al. ............... 700/95 |
| 2002/0069096 A1 * | 6/2002 | Lindoerfer et al. ............ 705/7 |

OTHER PUBLICATIONS

Trammell, Work Flow Without Fear, Byte, Apr. 1996.
RosettaNet Web site www.RosettaNet.org.

* cited by examiner

*Primary Examiner*—Leo Picard
*Assistant Examiner*—Charles Kasenge (57) ABSTRACT This invention is related to electronic product description transfer between a trading partner that designs a product and a trading partner that manufactures the product and more particularly to the organization and use of a catalog of component information used in the generation of process documents and programs to adapt an assembly process to assemble the product as specified in the electronic product description. In the present invention, a consolidated component catalog provides the information for a component used in the assembly of a product in two sections: an assembly process independent section and an assembly process dependent section. The assembly process independent information is used to correct and validate the product description information. The assembly process dependent information is used to generate the programs and documents to adapt an assembly process to assemble the product described in the product description. A component is identified using a part number from a part number system in the product description and the consolidated component catalog. Another product description using the same component may identify the component with a second part number from a second part number system. The consolidated component catalog relates the first part number and second part number to the component so that redundant component information is not created.

19 Claims, 5 Drawing Sheets

CONSOLIDATED COMPONENT CATALOG

CROSS-REFERENCE TO RELATED APPLICATIONS

Private Exchange Catalog System and Methods by Norman Ken Ouchi application Ser. No. 09/939,453 Filed Aug. 25, 2001

STATEMENT REGARDING FEDERALLY SPONSORED RESEARCH OR DEVELOPMENT

None

FIELD OF THE INVENTION

This invention is related to electronic product description transfer between a trading partner that designs a product and a trading partner that manufactures the product and more particularly to the organization and use of a catalog of component information used in the generation of process documents and programs to adapt an assembly process to assemble the product as specified in the electronic product description.

BRIEF SUMMARY OF THE INVENTION

In the present invention, a consolidated component catalog provides the information for a component used in the assembly of a product in two sections: an assembly process independent section and an assembly process dependent section. The assembly process independent information is used to correct and validate the product description information. The assembly process dependent information is used to generate the programs and documents to adapt an assembly process to assemble the product described in the product description. A component is identified using a part number from a part number system in the product description and the consolidated component catalog. Another product description using the same component may identify the component with a second part number from a second part number system. The consolidated component catalog relates the first part number and second part number to the component so that redundant component information is not created.

BACKGROUND OF THE INVENTION
Products Assembled from Components

In the electronics industry, many companies, called Original Equipment Manufactures or OEM, design and develop products that are manufactured by assembling components using an assembly process. Electronic printed circuit cards are an example of products assembled from components where components such as resistors, capacitors, integrated circuits, microprocessors, memory, and connectors are soldered to a printed circuit substrate to assemble the printed circuit card. Each component must be placed onto the printed circuit substrate with high precision and a typical printed circuit card may contain several hundred to several thousand components. The assembly process may use automated equipment to place components and other automated equipment to test that the printed circuit card was assembled correctly. Some of the automated equipment is designed to assemble a specific product. However, most of the automated equipment are programmable and may be adapted to assemble most printed circuit cards. Companies like Fuji, Panasonic, Universal, and others provide a wide variety of equipment that performs the component placement steps to assemble a printed circuit card. Each type of equipment has characteristics that make it ideal for particular modes of use. For example, some component placement equipment is designed for high volume production but takes time to change from one product to another. Other component placement equipment is designed for rapid change from one product to another but has a placement rate much lower than the high volume machine. Hewlett Packard, Gen Rad and others provide a wide variety of equipment to test that the correct components were placed and that the electronic circuits function. There are a large number of assembly and test equipment suppliers and the variety of equipment is large. Assembly and test equipment are grouped together to form an assembly process where the combined capabilities of the equipment perform the steps to assemble and test the product. The equipment can be adapted to assemble a product based on a description of the product. Products assembled from components are not limited to electronic printed circuit cards. Products fabricated from sheet metal are assembled using equipment adapted to produce the metal components that are then assembled to produce the product. Petrol-chemical products may be produced using chemical process lines with equipment that are programmed to produce specific products.

To adapt an assembly process to assemble a specific electronic printed circuit card product, each piece of assembly equipment must be programmed to position the printed circuit substrate and to place each component or to test each circuit to validate correct assembly. Some of the assembly operations may include manual process steps that require detailed assembly drawings and instructions for the assembly operators. In the past, the generation of programs for the equipment and documents for the assembly process was done manually. In the past 10 years, companies like Fab-Master and Unicam (both are now part of Tecnomatix-Unicam) developed and market software that take the Computer Aided Design file or CAD file that describes the printed circuit substrate and the position of each component, and the Bill of Material file or BoM file that describes the quantity and specific components of an electronic printed circuit card and from these files, a program generates the programs and documents to assemble the electronic card from the set of components. These programs are usually called Computer Aided Manufacturing programs or CAM programs. For a CAM program, the CAD and BoM files provide a complete description of a product. In addition, the CAM programs require information about each component such as precise component shape and dimensions, input and output pin assignments, carrier type, rotation position on the carrier, etc. as well as key characteristics of each automatic assembly equipment for which a program is to be generated. The CAM programs can also generate programs and documents to test the electronic printed circuit card. Additional information about each component such as resistance, capacitance, etc. is required to generate the tester program and documents. Some of this information is not provided by the component manufacturer and is derived from observations of the component tested in a printed circuit card. The CAM programs have data structures, called component catalogs, which may be used to store the component information. These data structures use the component part number to reference the information.

The part number system is the core of the product description for a company that designs and develops products since it provides the identification structure so that each component, product, etc. has a unique identifier. Each company has a self-consistent part number system. That is, each distinct component or item has a distinct part number that can be used to identify it. Two different components do not have the same part number. However, the part number system of two different companies may not be consistent with each other. A part number for a component in one company may be meaningless or assigned to a different component in another company. The Bill of Material provides an important part of the recipe to produce the product: the list of components and quantities of each component; the list is described in terms of part numbers. Suppliers provide some of the components. The Approved Manufacturer List, AML, provides the cross reference of a company's part numbers to a supplier's part number. The CAD describes the physical relationship of all of the components, usually as a set of drawings with each component labeled with its corresponding part number.

Many of the components are purchased from suppliers and the suppliers provide most, if not all, of the information required to place the component on the printed circuit substrate. The suppliers also provide much of the information for testing the component once assembled in the printed circuit card. The CAD file identifies that a component identified by its part number is to be placed at a specific location on the printed circuit substrate. The part number is used to identify the component in the BoM file. The part number is also used to identify the supplier and supplier part number in the AML so that the component parameters may be obtained from the supplier. The specific component parameters may depend on the characteristics of the assembly process. For example, a cookie baking process uses sugar. Sugar can be delivered in a variety of bag sizes, where a bag is a carrier for sugar, the equipment that uses in the process may require that a specific bag size be used and purchased from the supplier. The component carrier, carrier capacity, etc. must match the equipment and assembly process requirements. These steps are usually manual and performed by a component engineer. Once the component information is obtained, it is stored in a component catalog so that it may be reused when the component is used for another printed circuit card that uses that part with that part number. The relationship between the part number and the component information can be illustrated in a relational data base form in Table 1 where the part number is associated with the component information.

TABLE 1

Part Number to component information SQL table

| Part Number | Function | Shape | Carrier | Rotation |
|---|---|---|---|---|
| 1234-5678 | Capacitor | J1234 | TR2400 | 180 |
| 1234-5679 | Microprocessor | BGA200 | tray | 0 |

In the example in Table 1, the component with Part Number "1234-5678" is a capacitor that has a body Shape called "J1234" and delivered in a Carrier called "TR2400" with 180 Rotation. The component with Part Number "1234-5679" is a microprocessor with body Shape called "BGA200" and delivered in a tray with 0 Rotation. The shape, carrier, and rotation are among the many parameters that the CAM program uses to generate the assembly and test equipment programs. The CAM programs require significantly more component information than that illustrated in Table 1. The CAM program also requires information that specifies the assembly and test equipment. The component catalog provides a one—one mapping of the part number to the component information. The part numbers must belong to one part number system to avoid duplicate part numbers—one part number assigned to two different components. If the product that contained part number "1234-5678" were to be assembled using another assembly process where a different assembly equipment required a different carrier, then the entry for part number "1234-5678" must be modified to reflect the new carrier information and the CAM program run again the generate the new programs and documents. If part number "1234-5678" is assembled on two assembly processes with two different carrier requirements, then "1234-5678" must have two different entries. Since this causes major database problems, usually each assembly process maintains a separate component catalog to avoid the database problem. In practice, each assembly process has its independent component catalog.

Figure 1:
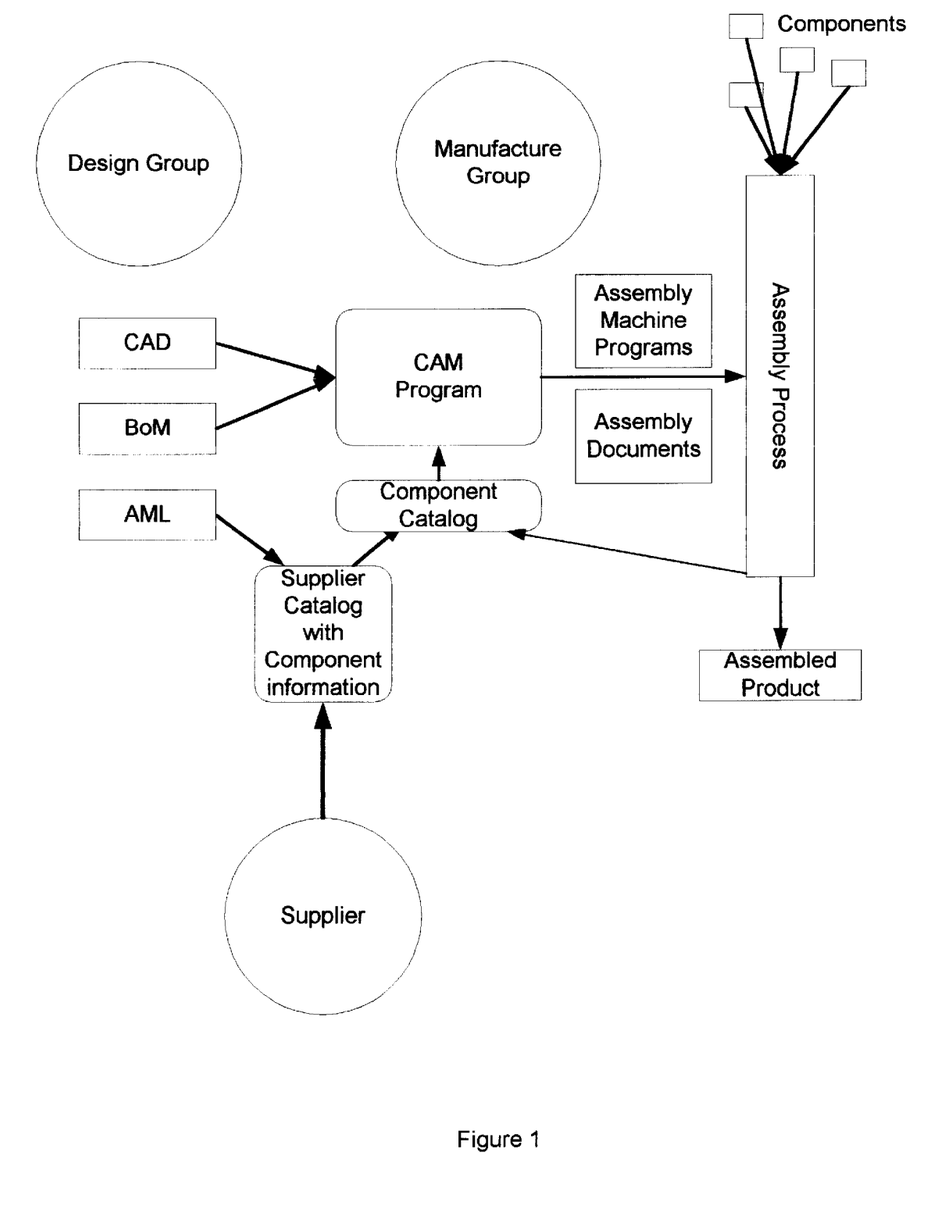
FIG. 1 illustrates the integrated process that generates the equipment programs and documents to adapt an assembly process based on the CAD, BoM and AML files and assembly process characteristics.

The process to generate the assembly and test machine programs and assembly documents is illustrated in FIG. 1 where the Design Group creates the CAD, BoM, and AML that describe the product. The Manufacturing Group determines the characteristics of the assembly process and selects the specific parts to order from the suppliers to accommodate the assembly process and equipment. The AML and the assembly process characteristics are used to select the supplier part number and obtain the component information. The component information is placed in the component catalog so that the information may be referenced using the part number assigned the component in the CAD, BoM, and AML files. The CAM program uses the CAD and BoM files to generate the programs for automated machines and assembly documents. These are used to adapt the assembly process to assemble the product described in the CAD file from the components specified in the BoM file. The process for adapting the assembly process has critical limitations: 1) a single part number system and 2) the specific characteristics of a specific assembly process. The CAM programs are designed to accommodate a wide variety of assembly and test equipment and do not require a specific part numbering system. However, the relationship between the CAD, BoM, AML, and the component catalog embed a specific part number system and the characteristics of a specific assembly process. These limitations limit wide use of these CAM programs and the benefits they provide. These limitations become more apparent when the product is outsourced and manufactured by a third party, the contract manufacturer or the provider of electronic manufacturing services.

Electronic Manufacturing Services

Many electronic OEM companies no longer manufacture the products they develop. Many new electronic OEM companies have never manufactured their products. These OEM use companies, called EMS, that provide Electronic Manufacturing Services which provide manufacturing facilities and component supply chain services. The EMS manufactures for many OEM companies and may provide manufacturing facilities at sites worldwide. The OEM provides the documents that describe the product to the EMS to build the prototype, the early manufacturing units, then volume build in manufacturing sites in several geographies. The EMS has multiple sites that have focused responsibilities: sites for rapid prototype production, sites for medium volume production, and sites for high volume production. The sites are in different geographies: North America, South America, Asia, Europe, etc. These business requirements limit the effectiveness of the CAM programs that adapt an assembly process using the CAD, BoM, and AML. An EMS site will support multiple OEM customers each with their own part numbers in their CAD, BoM, and AML files. An EMS site may have component information for the same component but since they are referenced using the part numbers of different OEM companies, the component appears as multiple components. An EMS with multiple sites may have component information for the same component from the same supplier with different part numbers on behalf of an OEM because of the different supplier part numbers in the AML to accommodate site equipment differences. The root cause of this problem is the lack of cross correlation between part numbers in the various part number systems. The EMS creates some of the part number issues. Each EMS site maps an OEM part number to an EMS site part number. Each site may have a different mapping mechanism so an OEM item may have a very different part number at each EMS site. Each EMS site must map the OEM part numbers in BoM and AML to the EMS site part number so that the BoM and AML are adapted to the EMS site. In addition, the AML is further adapted to match the EMS site equipment requirements. Each site has automated equipment that is suited for the type of business they support: prototype, medium volume, or high volume. The equipment may be from different manufacturers and each may have different carrier requirements. The items are fed into the automated equipment using carriers that are part of the product delivered by the supplier. The carrier type must match the requirement of the assembly equipment. An item delivered on carrier type A has a different supplier part number from the same item delivered on carrier type B. In the sugar example, the 50 pound bag has a different part number from the 100 pound bag. Both contain sugar but each bag size is a different carrier and has a different supplier part number. An electronic component may have a variety of tape and reel carriers, a variety of tray carriers, etc. and each has a different supplier part number. Because of the one to one relationship between the part number and the component information, creating and maintaining the information in the component catalog is difficult and error prone. When a product is moved to an assembly process that requires a different carrier, the component information must be changed. If the product is assembled on two assembly processes where each process requires a different carrier, then another part number must be created to accommodate the two different sets of component information. When an OEM uses a new part number, it may be difficult to determine if the same component is already described under the part number of another OEM. The result is a large proliferation of component information entries with many duplicated fields. As an example to estimate the size of the catalog, suppose that each OEM has 10,000 part numbers, with products assembled on 10 different assembly processes that have different carrier requirements, then each OEM would require 100,000 entries in the component catalog. This calculation assumes that each component has a process dependent difference for each component. This is generally not true. However, because the catalog structure is not designed to accommodate components with two (or more) assembly process differences, in practice, each assembly process component catalog would maintain a complete set of component information for the assembled product with the component information adapted to support the assembly process. If the EMS has 200 OEM customers, then the complete component catalog would have 20,000,000 entries. But because of the OEM part number and component carrier issues, the EMS does not see 20 million entries in one database but rather has 2,000 databases with 10,000 entries each. Each database is created and maintained by 2,000 manufacturing engineering teams. However, since these are different databases, transferring a product from an assembly process supported by one component catalog database to another assembly process supported by another component catalog database is difficult. The variety of part number systems and cross-referencing has been recognized as an issue. Manual processes for establishing and maintaining cross-reference tables have been difficult and error prone. The root of this problem is the need to have assembly process component information as part of the component catalog.

The EMS would gain significant benefit from CAM programs that could generate the assembly and test equipment programs and the assembly documents since the EMS assembly processes must support a variety of products. Bringing a new product into production faster would be a competitive advantage. More importantly, the ability to assemble a new product quickly, even in small quantities, is a significant competitive capability for building prototype units for the OEM. The ability to transfer a product from an assembly process optimized for prototypes, to an assembly process optimized for low volume production and then to later to transfer the product to medium or high volume production assembly processes in different global locations would be another significant competitive advantage.

The CAM programs from FabMaster and Unicam have been in the market for almost ten years. These programs support all of the assembly and test equipment used by the EMS and OEM companies. The equipment programs the CAM programs generate can be optimized to perform better than those created by engineers. But the uses of these programs have been limited and their potential capabilities have not been achieved. Part of the problem is the need to establish and maintain the cross-reference between the OEM part number, the EMS part number, the EMS site part number, and the supplier part number. The referenced patent application provides a solution to the part number problem. Another facet of the problem is the component catalog. The component catalog embeds the assembly process characteristics into the component information. The component catalog provided by the CAM programs assumes that the product has a single part number structure and that the product will be assembled on a single assembly process line. For an EMS and larger OEM companies, both of these assumptions are not true and limit the use of the CAM programs. Manual processes with some systems assistance have been applied to mitigate the effects of the assumptions. However, these manual processes are error prone and add delay to the fast moving changes demanded by commerce. Extending the current manual processes with automation will not work because the manual processes only focus on one or two symptoms of the issues and do not account for the interrelationship between the part number system and the assembly process characteristics. A new consolidated methodology is required.

DESCRIPTION OF THE INVENTION

The objectives of the invention are to create a component catalog that is consolidated rather than fragmented, more easily maintained, supports rapid introduction of new products, and supports transfer of a product from one assembly process to another. The consolidated component catalog is an aid to realizing the benefits of CAM programs. The prior art component catalog associates a part number of a component to the component information required to assemble the product on a specific assembly process. The present invention divides the component information into two sections that are used in two phases of the generation of the equipment programs and assembly documents to adapt an assembly process to assemble a specific product. One section provides assembly process independent component information. Component shape, pin assignment, centroid, resistance, capacitance, etc. are component characteristics independent of the assembly process. These characteristics are those of the component independent of how the component is fed into the assembly equipment. Most of the component characteristics are assembly process independent. The other section provides assembly process dependent component information. Component carrier, rotation, etc. are component characteristics that are dependent on the assembly process since the assembly equipment determines the form in which the components are fed. There are few characteristics that are assembly process dependent. A component may have number of different carrier types, an assembly process dependent characteristic, and would be represented with one set of process independent information and one set of process dependent information for each carrier type. Table 2 and Table 3 represent SQL tables to represent the Consolidated Component Catalog where Table 2 represents the assembly process independent information and Table 3 represents the assembly process dependent information.

TABLE 2

Assembly Process Independent
Component Information SQL Table

| Unique Component ID | Function | Shape |
|---|---|---|
| 11 | Capacitor | J1234 |
| 12 | Microprocessor | BGA200 |

TABLE 3

Assembly Process Dependent
Component Information SQL Table

| Row ID | Unique Component ID | Carrier | Rotation | Process |
|---|---|---|---|---|
| 121 | 11 | TR2400 | 180 | Tape/Reel |
| 123 | 12 | Tray | 0 | |
| 124 | 11 | Bulk5000 | | Bulk |

Table 2 is the primary table with Unique Component ID as the primary key. Function, Shape, etc. are the Assembly Process Independent characteristics of the component. (As stated, there are many more component characteristics than used in the examples and would be represented by additional columns in the table.) Table 3 is a secondary table with Unique Component ID as the foreign key and may have key values that are not unique. The component with the Unique Component ID=11 in Table 2 has two entries in Table 3. The field called Process is used to distinguish between the rows with Unique Component ID=11. In the example, the component with Unique Component ID=11 has a Carrier TR2400 with 180 Rotation for Process="Tape/Reel" and has Carrier Bulk5000 and no Rotation for Process="Bulk". (The Row ID column provides a unique identifier for each Assembly Process Dependent row. A possible use of this field will be described in the paragraph on Supplier part number.) The Table 2 and Table 3 can provide all of the information a component for a specific process. If an OEM requires 10,000 unique components, Table 2 will have 10,000 rows, one for each component. Table 3 will also have at least 10,000 rows, one for each component. Each additional carrier, rotation, or other assembly process dependent difference, will add one row in Table 3. In the example to estimate the size of the component catalog, the OEM product is assembled at 10 different EMS assembly processes that require different carriers resulting in 100,000 rows in Table 3. However, not every component requires a different carrier and there will be a significant number of redundant rows. Since the tables will support components that have assembly process dependent differences, only the differences need be in Table 3. Table 3 will have significantly less than the 10,000 row estimate. Also, each Table 3 row is short since the assembly process dependent information is a few fields. The bulk of the information for each component is in Table 2. One can show that the component information needed to support an OEM with 10,000 part numbers is significantly less than required for the prior art component catalog. But of greater importance is that each component is represented as one row in Table 2 independent of the number assembly process dependent differences for the component. When the OEM releases a new component with a new part number, it is possible to query Table 2 to determine if the component is unique and not a copy of a component that has been already entered in the component catalog. If the OEM changes a component, all of the changes may be localized to the single row in Table 2. In the prior art component catalog, the component catalog may in fact be a set of separate databases and the information may not be changed in a consistent manner. The Internet Web technology can be used so that all of the engineers that need to have access to the component information can access it in real time and select the component information necessary for the generation of programs and documents based on their assembly process dependencies. The component information can be maintained using a consistent and reliable process. The Assembly Process Dependent information in Table 3 with the Assembly Process Independent information corresponds to an orderable part. Note that one capacitor cannot be an orderable part since it does not include a carrier, etc. But the Assembly Process Dependent entry may be ordered since the orderable part is not a single capacitor but, for example, a reel of 2400 capacitors. An entry in Table 3 represents a specific supplier part and has a supplier part number. The part may be ordered from more than one supplier or may have different part numbers from a supplier because of regional designation, etc. An additional table for supplier and supplier part number can be linked to Table 3 using the Row ID field as the foreign key. Table 4 illustrates a table relating the Assembly Process Dependent information to a supplier and supplier part number.

TABLE 4

Supplier and Supplier Part Number for an orderable part.

| Part ID | Row ID | Supplier | Supplier Part No. |
|---------|--------|-----------------|-------------------|
| 322 | 121 | Able Capacitors | 446-987AXTR2400 |
| 323 | 124 | Able Capacitors | 446-987QB5000 |
| 324 | 123 | Intel | I86453 |
| 325 | 121 | Joe's Capacitors| 6784642 |

In the example, Row ID=121 represents capacitors in a TR2400 carrier. Table 4 indicates that these can be ordered from Able Capacitors using the supplier part number "446-987AXTR2400" or from Joe's Capacitors using the part number "6784642". The supplier part number is part of the AML that may be provided by the OEM. When the OEM releases a new part, the AML information may be used to query the Supplier and Supplier Part No. fields to find a possible match as well as querying Table 2 for the Assembly Process Independent information.

The CAD, BoM, and AML from an OEM use the OEM part number system. The OEM part numbers must be related to the component catalog information. Table 5 maps the OEM part number to the component catalog entries in Table 2.

TABLE 5

OEM Part Number To Component Catalog Relationship.

| OEM P/N ID | OEM ID | OEM Part No. | Unique Component ID |
|------------|--------|--------------|---------------------|
| 23 | 4 | 1234-5678 | 11 |
| 24 | 4 | 1234-5679 | 12 |
| 25 | 17 | 786434 | 11 |
| 26 | 23 | 1234-5679 | 11 |

The part number systems for each OEM are self-consistent but will not be consistent with the part number system of another OEM. The OEM part numbers must be segregated so that each OEM has an independent part number space. This may be accomplished by adding another field, OEM ID, or by adding a prefix to the OEM part number. The OEM in the example for Table 5 has been given OEM ID=4. The OEM Part No.="1234-5678" maps to Unique Component ID=11, the capacitor in Table 2. The OEM Part No.="1234-5679" maps to Unique Component ID=12, the microprocessor in Table 2. The part number systems used by different OEM companies are not coordinated and are not consistent with each other. An OEM can use a different part number for the same component used by another OEM. The OEM with OEM ID=17 uses OEM Part No.="786434" which maps to Unique Component ID=11, the capacitor in Table 2. An OEM can use a part number used by another OEM to identify a different component. The OEM with OEM ID=23 uses OEM Part No.="1234-5679" which maps to Unique Component ID=11, the capacitor in Table 2. The OEM with OEM ID=4 uses "1234-5679" to identify the microprocessor. Table 5 accommodates all of these cases.

Many of the components used by an OEM are used by other OEM's. Table 5 permits reuse of the component information in Table 2. This not only provides a significant reduction in the number of rows in the database but also removes redundant information making the information maintenance process significantly more effective. An update of information for one OEM updates the information for all OEM's that use the component. The estimate for the size of the prior art component catalog resulted in 2,000 databases of 10,000 component entries each. A single, consolidated database using the prior art would contain 20,000,000 component entries. The Consolidated Component Catalog can contain all of the component information in a single database and the size of the database would be significantly reduced compared to the prior art because the assembly process dependent entries would be small rows in Table 3 rather than large entries in Table 2 and the components that are used by multiple OEM companies would have a single entry for each unique component. If the overlap were as low as 50%, the size of Table 2 would be reduced by a factor or 20 to about 1,000,000 rows. Many of the components are commodities such as resistors and capacitors and the overlap among the OEM companies for these components is close to 100% so the total overlap may be much higher than 50% and the size of the database for the Consolidated Component Catalog much smaller. However, the size of the database is not the major competitive advantage. Competitive advantage is gained because of two factors:

1) The consolidated component catalog provides an effective process to create and maintain the catalog as new components are added and existing components are modified or deleted. These processes were described in the preceding sections.

2) The consolidated component catalog provides a consistent process for the generation of the equipment programs and assembly documents while accounting for the assembly process dependencies. This capability will permit introduction of new products, transfer of products from an assembly process to another assembly process, and consistent implementation of engineering changes for products on multiple assembly processes.

Figure 2:
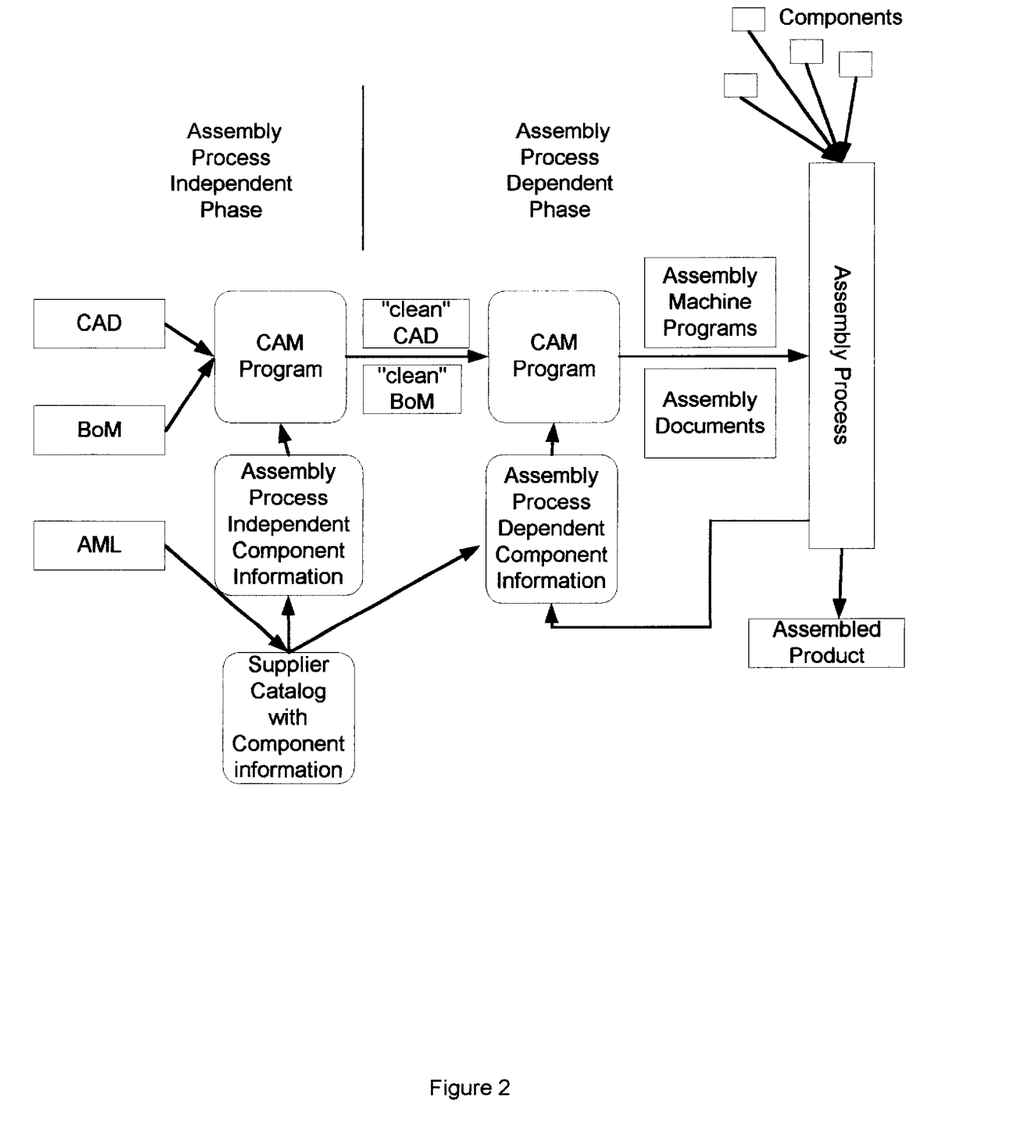
FIG. 2 illustrates the separation of the adaptation generation process into an Assembly Process Independent Generation segment and an Assembly Process Dependent Generation Segment.

The two-phase process to generate the programs and documents is illustrated in FIG. 2 where the first phase uses the CAM program and the assembly process independent component information. The inconsistencies between the CAD and BoM and other potential sources of defects are resolved in this phase. For example, the CAD may describe a component used in three locations but the BoM may indicate only a quantity of two for the component. The part number for a part in the CAD may be different from the part number in the BoM. All of the CAD, BoM, and AML issues can be resolved in this phase. The information that describes the product is now consistent and "clean". The second phase uses the "clean" CAD and "clean" BoM and the assembly process dependent component information and the description of the assembly and test equipment for the actual assembly process. The CAM program then generates the equipment programs and assembly documents for the actual assembly process. The time required for the CAM program to generate programs and documents is measured in minutes. With clean input created in the first phase, the generated output files are error free. So, the process is very fast compared to manual generation, which may take days. (And may have errors.) Thus, a product or changes to a product may be affected quickly and accurately for an assembly process.

Figure 3:
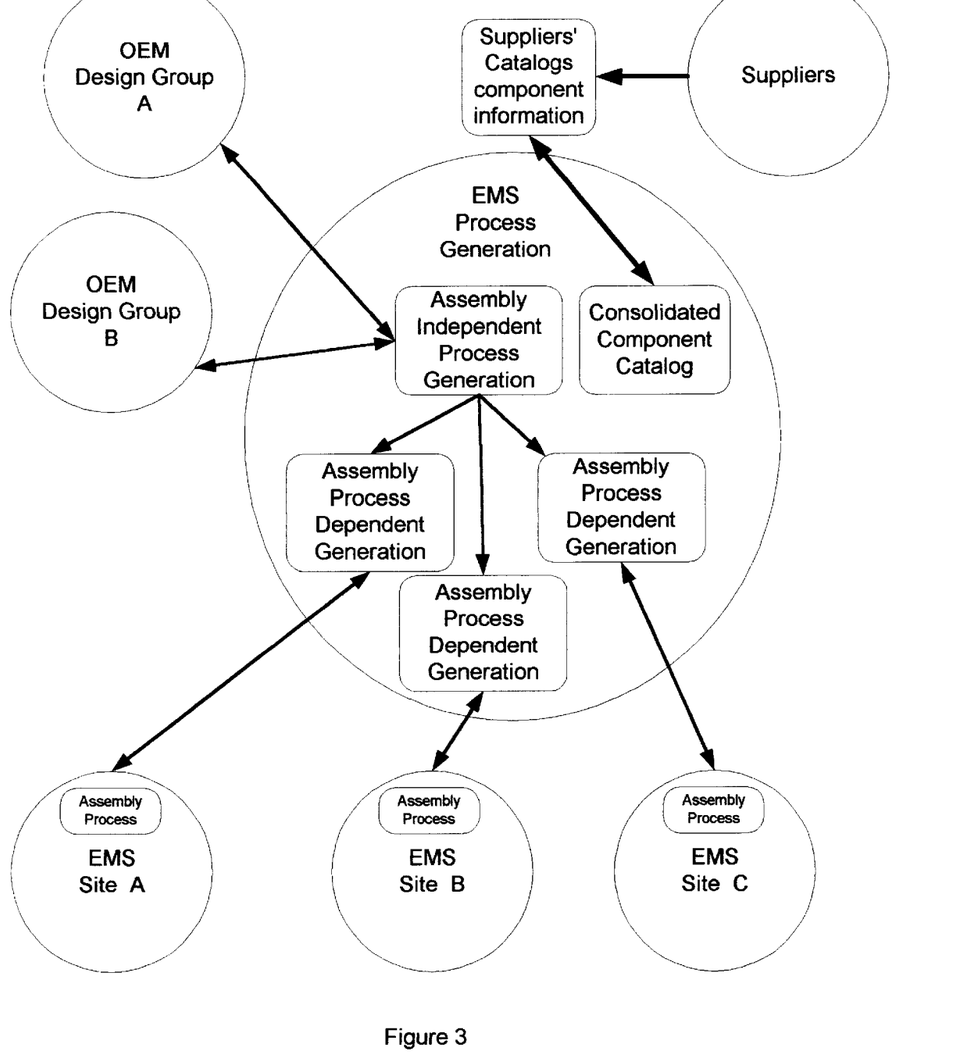
FIG. 3 illustrates a Consolidated Catalog System with the two OEM Design Groups, three EMS sites, and a Supplier with Assembly Process Independent Generation and Assembly Process Dependent Generation for each EMS site.

An EMS with many OEM customers, multiple sites and different assembly processes can use the two-phase process to great advantage. An example is illustrated in FIG. 3 where an EMS has two OEM customers, OEM Design Group A and OEM Design Group B, and three assembly sites, EMS Site A, EMS Site B, and EMS Site C, each with an assembly processes. The process to generate the assembly programs and documents are centralized in the EMS Process Generation function. The EMS Process Generation function includes the Assembly Process Independent and Assembly Process Dependent generation phases using the Consolidated Component Catalog. The Suppliers are shown as the source of much of the component information. An OEM Design Group provides the CAD, BoM, and AML for a new product. The EMS Process Generation runs the first phase independent of the specific assembly process or assembly site to remove inconsistencies and errors. There may be discussions with the OEM development organization to resolve these issues. The issue resolution cannot be automated and runs at human speed. Phone calls and meetings may be required. The issue resolution may take hours or days.

Once the first phase is completed, the second—assembly process dependent—phase is executed for a specific assembly process at EMS Site A. The second phase may also be executed with the assembly process definition for EMS Site B and EMS Site C. The product can then be assembled at EMS Site A, EMS Site B, and EMS Site C.

When an OEM Design Group makes an engineering change, EMS Process Generation makes the change and the Assembly Process Independent generation is executed. Time for Issue resolution is the dominant time element. Once the issues are resolved, the Assembly Process Dependent generation executed for the assembly process lines where the product is built. The engineering change can be made effective at all assembly sites in a very short time.

The production of a product may move from one assembly process line to another assembly process line. For example, a product is first produced on an assembly process that is optimized for low volume production and quick product changes and moved to an assembly process that is optimized for high volume and longer product change time. The CAD, BoM, and AML were originally processed independent of the assembly process to correct issues and create a "clean" CAD and "clean" BoM. The "clean" CAD and "clean" BoM were then processed to generate the programs and documents for the low volume assembly process. To transfer the product to the high volume assembly process, the "clean" CAD and "clean" BoM are processed to generate the programs and documents for the high volume assembly process. The product transfer procedure is not the taking of programs and documents from the first assembly process and transforming them to fit the second assembly process but rather the programs and documents are generated directly from the "clean" CAD and "clean" BoM.

Figure 4:
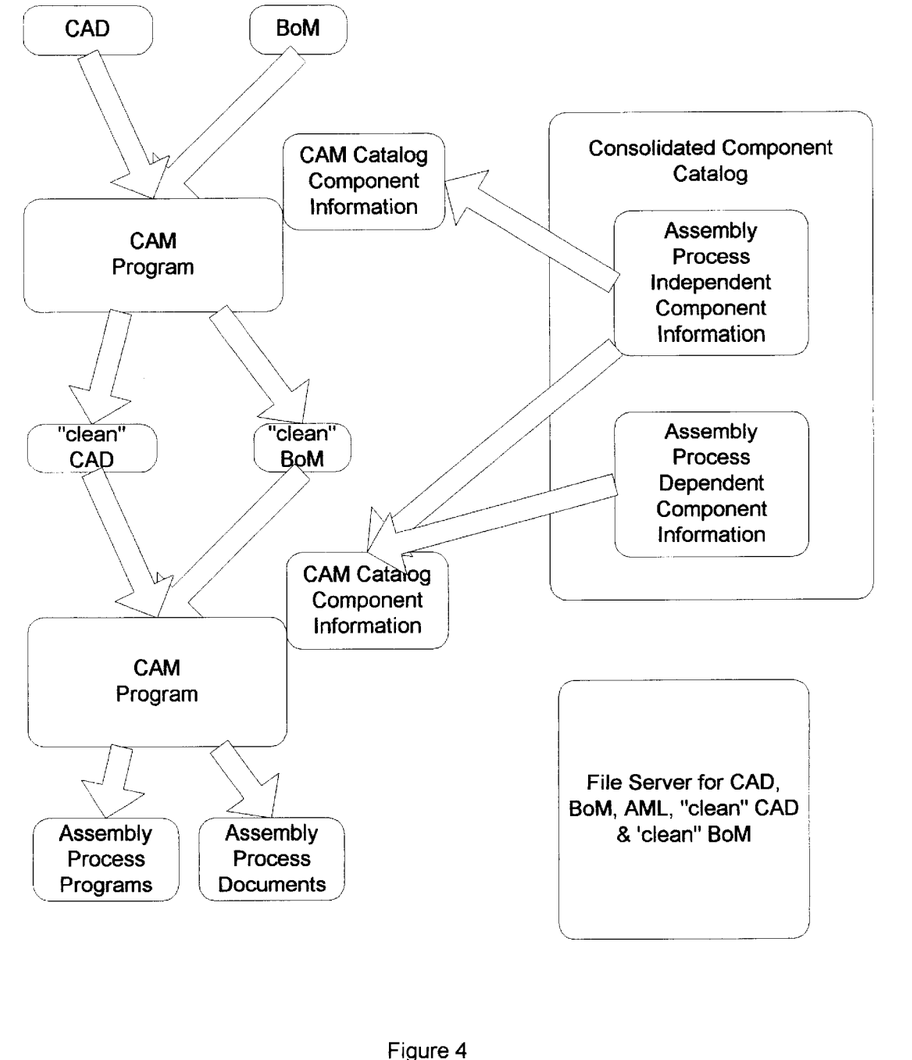
FIG. 4 illustrates the relationship between two OEM part numbers, the Consolidated Catalog part number and Assembly Process Independent component information and two elements of Assembly Process Dependent component information related to supplier part numbers. The two sections of the Consolidated Component Catalog: Assembly Process Independent component information and Assembly Process Dependent component information are also illustrated.

The EMS Process Generation function need not be physical location but rather a virtual Internet site where the Consolidated Component Catalog and file storage for the CAD, BoM, and AML files may be accessed. The EMS engineers and operators can download the appropriate files and execute the CAM programs at their desktops. The CAM program need not execute on the Internet site but may execute on the desktop of an engineer. Many of the CAM programs are designed to operate with the assembly process information in a specific format for that program. In FIG. 4, the CAD and BoM are received from the OEM development organization. The original files are stored in the file server. The BoM and AML are parsed to determine the set of distinct part numbers. The component information for this set of part numbers needs to be in the CAM component catalog. The set of distinct part numbers and the OEM ID assigned to the OEM are used to extract the assembly independent component information from Table 5 and Table 2. The extracted information is formatted to match the format required by the CAM program as the CAM component catalog and downloaded from the Internet site to the desktop for use with the CAM program. The CAM program, the CAM component catalog, the CAD, and the BoM are then used to identify issues in the CAD and BoM that need to be resolved so that the programs and documents generated by the CAM program will not have errors. When the error identification and resolution is complete, the CAD and BoM are now "clean". The "clean" CAD and "clean" BoM are stored in the file server in the Internet site. This completes the assembly process independent generation phase.

The assembly process dependent generation phase requires that a specific assembly process be identified. The assembly process dependent information for the set of distinct part numbers is extracted from the consolidated component catalog from Table 5 and Table 2 as described earlier and from Table 3 by selecting the values for the PROCESS field for each component that support the assembly process. The assembly process dependent component information is formatted to match the format required by the CAM program as the CAM component catalog and downloaded from the Internet site to the desktop for use with the CAM program. The CAM program requires parameters that define the assembly and test equipment and the manual process steps. The determination and storage of these parameters are not covered in this application but are well know to those skilled in the art of program and document generation using the CAM programs. The "clean" CAD and "clean" BoM are downloaded to the desktop and the CAM program is executed and generates the programs for the assembly and test equipment and the documents for the assembly process. The programs and documents can be then used to assemble the product. This completes the assembly process dependent generation phase. Note that the assembly process independent and assembly process dependent generation phases may be executed concurrently and the resulting "clean" CAD and "clean" BoM used as input to generate the programs and documents for another assembly process by executing the assembly process dependent generation for the other assembly process.

DESCRIPTION OF A PREFERRED IMPLEMENTATION

Figure 5:
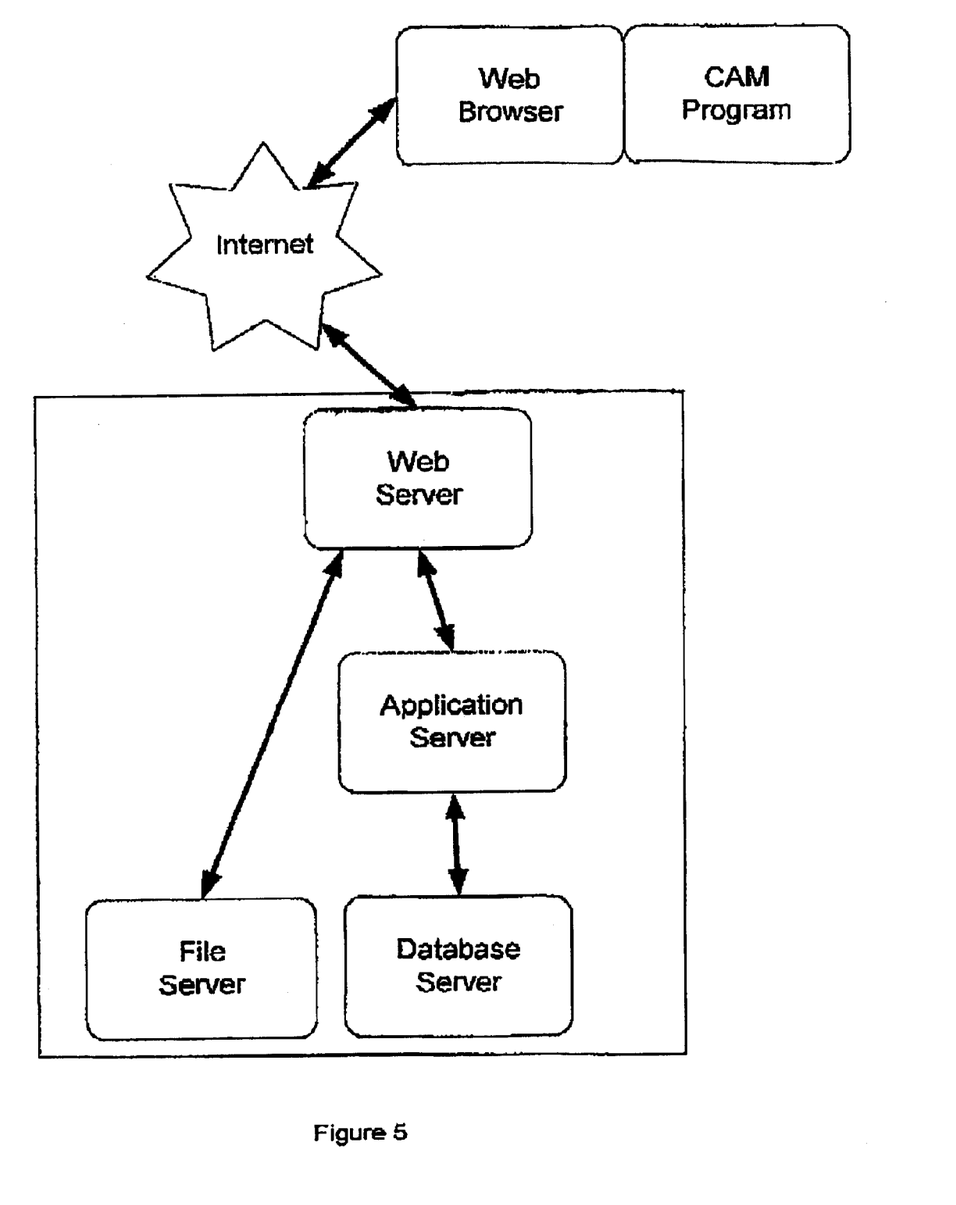
FIG. 5 illustrates the servers in a preferred embodiment of a Consolidated Component Catalog.

A Consolidated Component Catalog, illustrated in FIG. 5, consists of an Application Server, a Web Server, and a Data Base Server. A File Server is included in the illustration. These servers are software programs that execute on server hardware such as a PC from Dell or Compaq, a workstation or network server from SUN or Hewlett Packard, or a mainframe computer from IBM. The server hardware can have operating system services using for example, Microsoft Windows NT, Windows 2000, Sun Solaris, Hewlett Packard HP/UX, IBM O/S 9000, Lenix, etc. The Application Server program may be written in Java, C++, Visual Basic, or a variety of programming languages. Or, the program may be written to execute in an applet or Java bean server such as provided by BEA Web Logic Software or IBM Web Sphere or others. Microsoft Internet Integration Server, Netscape Web Server, or a variety of web server programs may provide the Web server program. Oracle 9i Data Base, IBM DB2, Microsoft SQLServer, or other databases may provide the data base program for the Data Base server. The Web server connects to the Internet. Using the Internet, the Web Server connects to one or more Web clients executing a Web browser, for example, Microsoft Internet Explorer or Netscape Navigator. The Web clients may be workstations, PC's, mainframe terminals, etc. However, a number of web clients are wireless devices such as: PDA's, cell phones, two way pagers, etc. The Web client is used to access the Consolidated Component Catalog to obtain the Assembly Process Independent Component Information and Assembly Process Dependent Component Information for use by the CAM Program.

A program in the Application Server provides the Consolidated Component Catalog functions and uses the Web Server to connect to the Web clients and uses the Database Server to store and access the component information as described in Table 2, Table 3, Table 4, and Table 5.

Large classes of products are produced by assembling components. Automated assembly and test equipment can be grouped to form an assembly process to produce these products. An assembly process can be adapted to produce a specific product by providing programs for the automated equipment and documents for manual process steps. The product to be assembled is described by documents such as a Computer Aided Design file and a Bill of Material file. The programs and documents for an adaptable assembly process can be generated by Computer Aided Manufacturing programs from the CAD and BoM files. The CAM programs also require information about the components that are to be assembled and the assembly and test equipment. The information about the components is organized and accessed in a CAM database called a component catalog. The product description, CAD & BoM files, use a part number system to identify the components. The component catalog must use the same part number system. Some of the information for each component depends on the assembly equipment in the assembly process and the CAM component catalogs have been specific to an assembly process. This has resulted in a proliferation of CAM component catalogs, one per assembly process. The component catalog must be kept current as new components are added and current components are changed or deleted. An organization with multiple different assembly processes must maintain multiple component catalogs and thus, information about a component can be incorrect and inconsistent among the component catalogs. An organization supporting multiple part number systems must also have separate CAM component catalogs for each part number system. Embedded in the prior art CAM component catalog are the part number system and the characteristics of the specific assembly process that the CAM component supports. The CAM programs are designed to support all of the commercially important assembly and test equipment. However, the CAM component catalog limitations have limited the effective use of the CAM programs. The potential benefits of the CAM programs: rapid new product into production, rapid changes on products in production, and transfer of production of a product from an assembly process to another assembly process have not been realized.

The Consolidated Component Catalog separates the component information into assembly process independent component information and assembly process dependent information and provides a part number system independent component reference. The assembly process independent information is the primary reference. The assembly process dependent information and the part number have a many to one relationship to the assembly process independent information. A component can be assembled on multiple assembly processes and have multiple part numbers. The information for a component is isolated to its essential elements and is easier to maintain. The assembly process dependent component information can be related to the supplier of the component and the supplier part number. An organization with multiple assembly processes supporting multiple part number systems can have a single Consolidated Component Catalog rather than multiple CAM component catalogs each supporting an assembly process and part number system. Much of the manual processing in the CAM generation process is the validation of the product description—the identification and resolution of issues in the product description, the CAD and the BoM. Once the product description is validated or "clean", the programs and documents are quickly generated. This two-phase generation process can be used to assemble a product in multiple assembly processes by using the assembly process independent component information for the validation phase and the assembly process dependent component information for each assembly process to generate the programs and documents specific to the assembly process. A product in production at an assembly process can be transferred to a second assembly process by executing the second phase using the assembly process dependent component information for the second process.

The CAM programs still require the CAM component catalog. The component information required for a generation phase is extracted from the Consolidated Component Catalog and formatted to the CAM component catalog format for use by the CAM program. The Consolidated Component Catalog may be accessed over a local area network, a wide area network, or the Internet.

The Consolidated Component Catalog and the two phase generation process provides the infrastructure that permits the CAM programs to fulfill their potential benefits.

I claim:

1. A Consolidated Component Catalog, a Computer Aided Manufacturing Program, a description of a product assembled from components and a first adaptable assembly process wherein the Consolidated Component Catalog contains Assembly Process Independent Component Information such that the Computer Aided Manufacturing Program uses the Assembly Process Independent Component Information to correct and validate the description of the product.

2. The Consolidated Component Catalog of claim 1, wherein the Consolidated Component Catalog further contains Assembly Process Dependent Component Information associated with the first assembly process such that the Computer Aided Manufacturing Program uses the validated description of the product and the Assembly Process Dependent Component Information to adapt the first adaptable assembly process to assemble the product.

3. The Consolidated Component Catalog of claim 1 and a second adaptable assembly process, wherein the Consolidated Component Catalog further contains Assembly Process Dependent Component Information associated with the second assembly process such that the Computer Aided Manufacturing Program uses the validated description of the product and the Assembly Process Dependent Component Information to adapt the second adaptable assembly process to assemble the product.

4. The Consolidated Component Catalog of claim 1 and a description of a product wherein a component is identified in the Consolidated Component Catalog and in the description of a product by a first part number from a first part number system.

5. The Consolidated Component Catalog of claim 1, a description of a first product and a description of a second product wherein a component is identified in the Consolidated Component Catalog and in the description of the first product by a first part number from a first part number system and in the description of the second product by a second part number from a second part number system.

6. The Consolidated Component Catalog of claim 1, wherein the Consolidated Component Catalog further contains Assembly Process Dependent Component Information, which further includes for a component the name of the component supplier and the component identifier assigned by the supplier.

7. The Consolidated Component Catalog of claim 1, wherein the Consolidated Component Catalog information can be extracted and formatted to adapt to the component catalog of the Computer Aided Manufacturing program.

8. The Consolidated Component Catalog of claim 1 is connected to a network, such that the Consolidated Component Catalog information can be accessed using a local area network or a wide area network or the Internet.

9. The Consolidated Component Catalog of claim 1 is connected to a network, such that the Consolidated Component Catalog information can be maintained using a local area network or a wide area network or the Internet.

10. A two-phase assembly process adaptation process; a Consolidated Component Catalog containing assembly process independent component information and assembly process dependent information; a first adaptable assembly process; and a description of a product, wherein the two-phase assembly process adaptation process:
    uses the assembly process independent component information to correct and validate the description of the product and generate a validated description of the product and
    uses the assembly process dependent component information and the validated description of the product to adapt the first adaptable assembly process to assemble the product described in the validated description of the product.

11. The two-phase assembly process adaptation process of claim 10 and a second adaptable assembly process wherein the two phase assembly process adaptation process uses the assembly process dependent component information and the validated description of the product to adapt the second adaptable assembly process to assemble the product described in the validated description of the product.

12. The two-phase assembly process adaptation process of claim 10, a validated description of a product, a first adaptable assembly process assembling the product described in the validated description, and a second adaptable assembly process, wherein the two phase assembly process adaptation process uses the assembly process dependent component information and the validated description of the product to adapt the second adaptable assembly process to assemble the product described in the validated description of the product to affect the production transfer of the product described in the validated product description from the first adaptable assembly process to the second adaptable assembly process.

13. The two-phase assembly process adaptation process of claim 10 and a description of a product wherein a component is identified in the Consolidated Component Catalog and the description of a product by a first part number from a first part number system.

14. The two-phase assembly process adaptation process of claim 10, a description of a first product and a description of a second product wherein a component is identified in the Consolidated Component Catalog and in the description of a first product by a first part number from a first part number system and in the description of a second product by a second part number from a second part number system.

15. The two-phase assembly process adaptation process of claim 10 wherein a component in the Assembly Process Dependent Component Information of the Consolidated Component Catalog has an associated supplier name and supplier part number in the Consolidated Component Catalog.

16. A consolidated CAM program component catalog, a CAM program, a description of a product assembled from components, and a first adaptable assembly process wherein the consolidated CAM program component catalog contains assembly process independent component information and assembly process dependent component information that are used by the CAM program to correct and validate the description of the product and adapt the first adaptable assembly process to assemble the product described in the validated description.

17. The consolidated CAM program component catalog of claim 16, a CAM program, a validated product description and a second adaptable assembly process wherein the CAM program uses the assembly process dependent component information and the validated product description to adapt the second adaptable assembly process to assemble the product described in the validated description.

18. The consolidated CAM program component catalog of claim 16 and a product description wherein a component in the consolidated CAM program component catalog and in the product description is identified with a first part number using a first part number system.

19. The consolidated CAM program component catalog of claim 16, a first product description, and a second product description wherein a component in the consolidated CAM program component catalog is identified in the first product description by a first part number from a first part number system and in the second product description by a second part number from a second part number system.

* * * * *